United States Patent [19]
Freeman

[11] Patent Number: 4,573,072
[45] Date of Patent: Feb. 25, 1986

[54] METHOD FOR EXPANDING INTERACTIVE CATV DISPLAYABLE CHOICES FOR A GIVEN CHANNEL CAPACITY

[75] Inventor: Michael J. Freeman, Sands Point, N.Y.

[73] Assignee: ACTV Inc., Port Washington, N.Y.

[21] Appl. No.: 591,863

[22] Filed: Mar. 21, 1984

[51] Int. Cl.$^4$ ............................................... H04N 7/10
[52] U.S. Cl. ........................................ 358/86; 358/146
[58] Field of Search .................. 358/84, 86, 142, 146; 455/2, 3, 4, 5, 6; 273/DIG. 28

[56] References Cited
U.S. PATENT DOCUMENTS

| | | | |
|---|---|---|---|
| 4,264,924 | 4/1981 | Freeman | 358/86 |
| 4,264,925 | 4/1981 | Freeman et al. | 358/86 |
| 4,305,131 | 12/1981 | Best | 273/DIG. 28 |
| 4,331,974 | 5/1982 | Cogswell et al. | 358/86 |

*Primary Examiner*—Keith E. George
*Attorney, Agent, or Firm*—Stiefel, Gross, Kurland & Pavane

[57] ABSTRACT

The present invention relates to an interactive communication system, such as an interactive cable television system (10), for providing an interactive information output over a common output channel from a plurality of remotely transmitted different information inputs (22, 24, 26, 28, 30) and, more particularly, relates to a method for expanding the interactive displayable choices for a given channel capacity whereby multiple users of a one-way television signal distribution network (60) may obtain an individualized program information content for a television programming sequence, with the quantity of available interactively selectable program information contents for the television programming sequence being greater than the quantity of available channels (300, 302, 304, 306) of contemporaneous message transmission. The improved method of the present invention comprises the step of transmitting a plurality of different spatially adjacent multichannel television message stacks (308, 310, 312, 314, 316, 318, 320, 322, 324) over a plurality of contemporaneous channels (300, 302, 304, 306) with each of the adjacent multichannel stacks comprising a simultaneously transmitted plurality of different separately selectable substantially complete prerecorded television messages in real time over the plurality of contemporaneous television channels to the plurality of multi-channel television receivers (20) through the one-way distribution network (60), a single substantially complete television message being interactively selectable from the plurality of adjacent stacks for providing the real time interactive television message for the multi-channel television receiver (20).

31 Claims, 6 Drawing Figures

OVERALL BLOCK DIAGRAM

FIG. 3 COMMAND INSERTION BLOCK DIAGRAM

COMMAND DEVELOPEMENT
FLOW CHART

MICRO CONTROLLER

CH.1 ANNOUNCER 300

CH.2 302 | COMMERCIAL 1 308 | COMMERCIAL 4 314 | ANNOUNCER OR COMMERCIAL 7 320

CH.3 304 | COMMERCIAL 2 310 | COMMERCIAL 5 316 | COMMERCIAL 8 322

CH.4 306 | COMMERCIAL 3 312 | COMMERCIAL 6 318 (GENERAL) | COMMERCIAL 9 324

TA    TB    TC eg- COMMERCIAL 1 - MALE, UNDER 21, SINGLE;
COMMERCIAL 2 - FEMALE, UNDER 21, SINGLE;
COMMERCIAL 3 - MALE, OVER 21, SINGLE;
COMMERCIAL 4 - FEMALE, OVER 21, SINGLE
etc.

FIG.6

METHOD FOR EXPANDING INTERACTIVE CATV DISPLAYABLE CHOICES FOR A GIVEN CHANNEL CAPACITY

CROSS-REFERENCE TO RELATED APPLICATIONS

This application is related to my previous commonly owned U.S. Pat. Nos. 4,264,925 entitled "Interactive Cable Television System" naming Michael J. Freeman and Lawrence G. Kurland as joint inventors thereof, and 4,264,924, entitled "Dedicated Channel Interactive Cable Television System" naming Michael J. Freeman as the sole inventor thereof; and my copending U.S. patent application Ser. No. 390,877 filed June 22, 1982 now U.S. Pat. No. 4,507,680, entitled "One Way Interactive Multisubscriber Communication System" naming Michael J. Freeman as the sole inventor thereof. The present invention is believed to be an improvement over the subject matter of the aforementioned patents and application, the contents of which are specifically incorporated by reference herein in their entirety.

TECHNICAL FIELD

The present invention relates to interactive communication systems, such as cable television systems, and particularly to expanding the displayable choices for a given channel capacity in one way systems for providing an interactive information output over a common output channel from a plurality of remotely transmitted different information inputs.

BACKGROUND ART

Real time conversational student response teaching apparatus are known, such as described in U.S. Pat. Nos. 3,947,972 and 4,078,316. In addition, multiple choice student response systems are well known, such as exemplified by the systems disclosed in U.S. Pat. Nos. 2,921,385; 3,020,360; 2,826,828; 3,623,238; 3,546,791; 3,273,260; 3,665,615; 3,245,147; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example. None of these prior art systems, however, has been adapted to be employed in connection with conventional cable television in which an essentially one way system is convertible on a subscriber-by-subscriber basis into what appears to be a two way interactive network in which the television programming information to be received by the individual subscribers is individually selectable to enable the subscriber to receive either selectable multi-information television programming and/or regular television programming on the television reception channels of a conventional multichannel television receiver. Moreover, although prior art subscription cable television systems per se are known in which a plurality of unrelated television programs, under control of a computer, are transmitted over a common television channel for selection by the individual subscribers, such as disclosed in U.S. Pat. Nos. 3,814,841 and 3,757,225, such systems are not one-way interactive systems capable of independent subscriber selectable reception of simultaneously transmitted multi-information television programming and regular television programming over a common designated television reception channel. Such an arrangement would greatly expand the educational and entertainment capabilities and horizons of cable television systems with the prior art essentially being concerned with a severely limited quantity of users. The desire to expand the educational capabilities and horizons of mass entertainment media has greatly increased with the advent of cable television in which considerably more channels than were previously available are present. Nevertheless, even though cable television has existed for a number of years, it has not been employed, to applicant's knowledge with the exception of applicant's prior U.S. Pat. Nos. 4,264,925 and 4,269,924, in an interactive conversational type teaching or interactive entertainment system in which a mass audience of people, in addition to their regular programming, can receive individually controllable instantaneous real-time effective interaction with the questions being asked, and/or individual tailored messages or entertainment. Although such a system is described in the above U.S. Pat. Nos. 4,264,925 and 4,264,924, these prior systems do not provide for automatic selection of individual interactive responses based on prior accumulated interactive responses of the individual subscribers, such as by providing weighted values to the various responses; however, such a system is described in my aforementioned copending U.S. patent application Ser. No. 390,977, filed June 22, 1982, the contents of which were specifically incorporated by reference herein in their entirety. Nevertheless, these prior systems and methods for providing interactive cable television programming do not provide for both time and space multiplexing of integral video displayable program information so as to provide a quantity of available interactively selectable CATV program information contents for a given television programming sequence which is greater. Such an improvement over my prior systems is believed to significantly enhance the educational and entertainment value of such an interactive system while overcoming the various disadvantages of the prior art.

DISCLOSURE OF THE INVENTION

The present invention relates to an interactive communication system, such as an interactive cable television system, for providing an interactive information output over a common output channel from a plurality of remotely transmitted different information inputs and, more particularly, relates to a method for expanding the interactive displayable choices for a given channel capacity whereby multiple users of a one-way television signal distribution network may obtain an individualized program information content for a television programming sequence, with the quantity of available interactively selectable program information contents for the television programming sequence being greater than the quantity of available channels of contemporaneous message transmission. The improved method of the present invention comprises the step of transmitting a plurality of different spatially adjacent multichannel television message stacks over a plurality of contemporaneous channels with each of the adjacent multichannel stacks comprising a simultaneously transmitted plurality of different separately selectable substantially complete prerecorded television messages in real time over the plurality of contemporaneous television channels to the plurality of multi-channel television receivers through the one-way distribution network, a single substantially complete television message being interactively selectable from the plurality of adjacent stacks for providing the real time interactive television message for the multi-channel television receiver. The quantity of available interactively selectable prerecorded television messages in the adjacent stacks is greater than the quantity of the plurality of contemporaneous television channels with the plurality of stacks comprising a television programming sequence having an interactively variable program information content for a given television program. The program content for the given television program further comprises a common prerecorded television message commonly displayable during the given television program irrespective of any interactive selection of the interactively selectable television messages. The improved method further comprises the steps of providing the plurality of stacks over the plurality of channels to the multichannel receiver through the one-way distribution network from a multichannel storage means and interactively selecting in real time one of the selectable messages from the plurality of stacks for providing the television programming sequence program information content, a different interactive selection providing a different program information content for the television programming sequence. A different receiver is capable of independently selecting a different program information content for the television programming sequence. Each of the complete television messages in the plurality of stacks comprises a segway portion for providing an information transition between the common television message and the television programming sequence with the television programming sequence and the common television message being adjacent in real time in the given television program which comprises a plurality of such television sequences. In addition, the improved method of the present invention further comprises interactively creating a selection profile for a subscriber and interactively selecting in real time one of the selectable messages from the plurality of stacks based upon this selection profile, whereby a tailored program content for the television programming sequence for the subscriber may be provided. By employing the improved method of the present invention tailored televison commercials for particular subscribers can be provided with, for example, the television programming sequences comprising different television commercial messages or, for example, the television program may be an interactive game show with the televison programming sequence comprising different game scores. In such an instance, in an interactive game show, the game may be interactively played to obtain a selection profile with the selected messages comprising the different game scores based on the selection profile, whereby an interactive game may be played and scored in real time with the television program content being varied accordingly. In addition to the above, a change code signal may be transmitted from the head end to a plurality of television receivers over the one-way distribution network so as to make the receivers responsive to a different selection profile, whereby the selection profile upon which the interactive selection is based may be varied from the head end. Similarly, the selection profile may be interactively created in advance of transmission of the television program with the real time interactive selection being based upon the prior created selection profile. Thus, in accordance with the preferred method of the present invention, tremendous flexibility is provided for an interactive one-way television communication system by expanding the displayable choices for a given channel capacity.

BRIEF DESCRIPTION OF DRAWINGS

FIG. 6 is a diagrammatic illustration of a typical program information storage arrangement for use in accordance with the presently preferred method of the present invention.

BEST MODE FOR CARRYING OUT THE INVENTION

Figure 1:
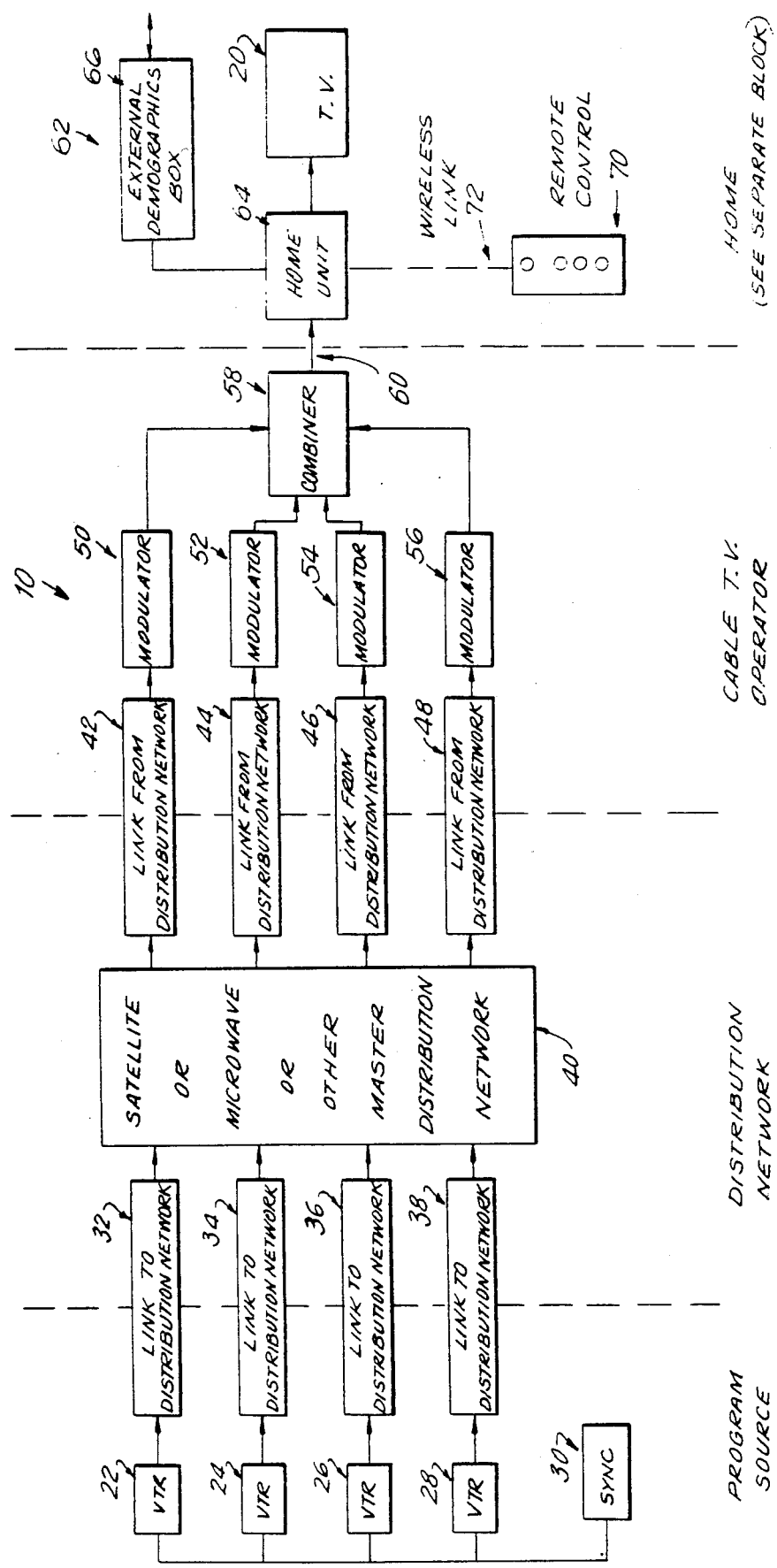
FIG. 1 is an overall system block diagram of a typical interactive cable television system capable of being employed in accordance with the presently preferred method of the present invention.
Figure 2:
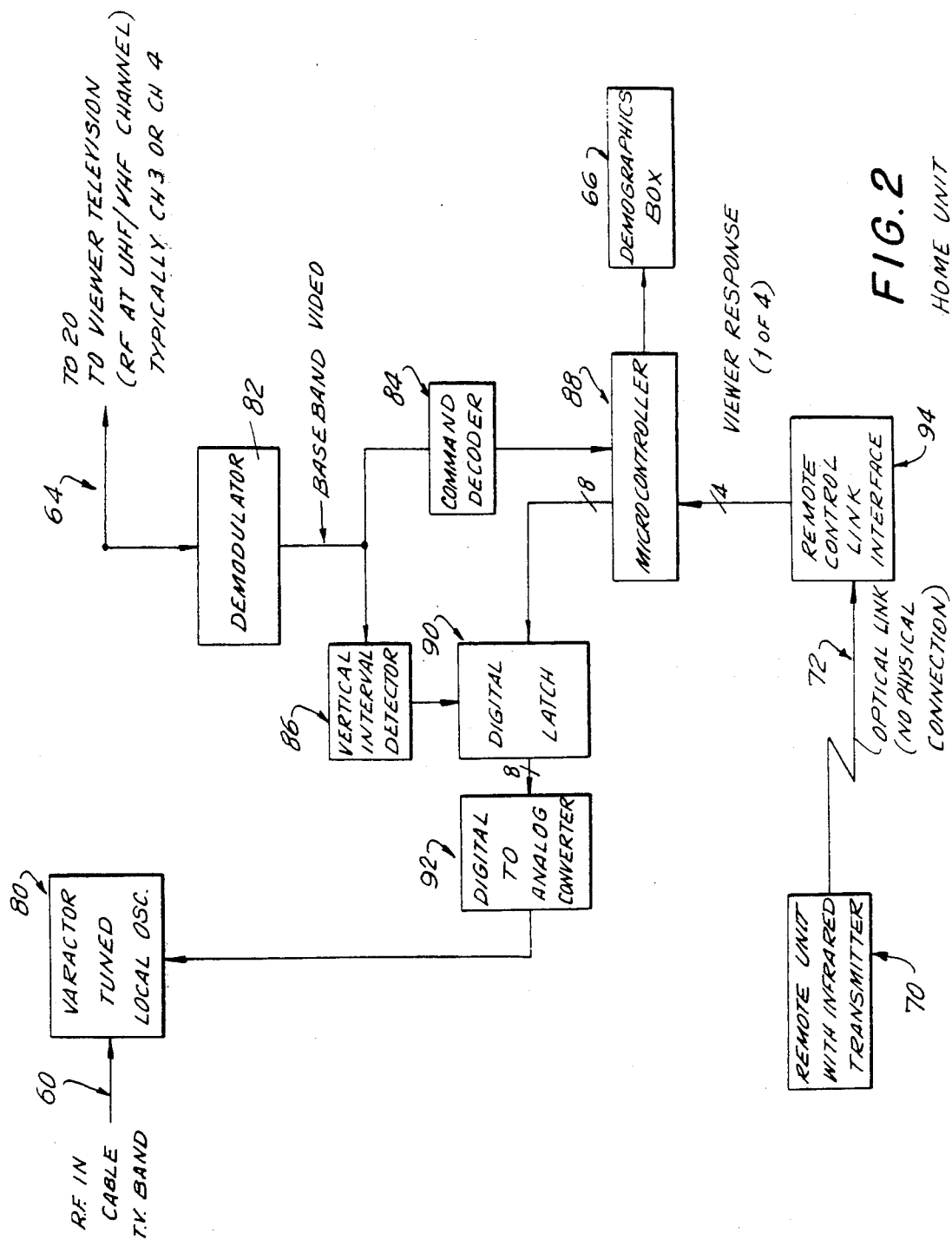
FIG. 2 is a block diagram of a typical home unit portion of the system of FIG. 1 capable of being employed in practicing the presently preferred method of the present invention.
Figure 3:
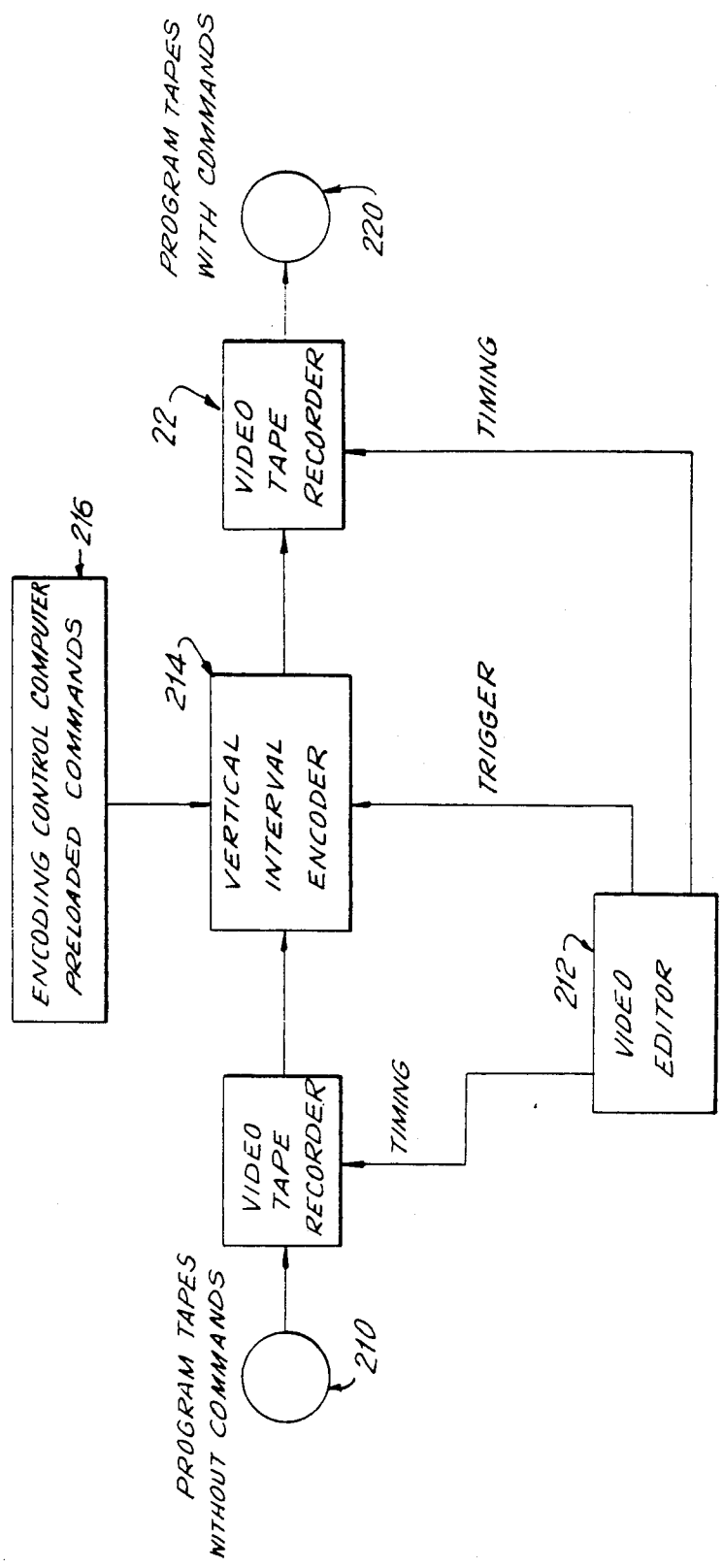
FIG. 3 is a diagrammatic illustration of the command insertion portion of the presently preferred method of the present invention.
Figure 4:
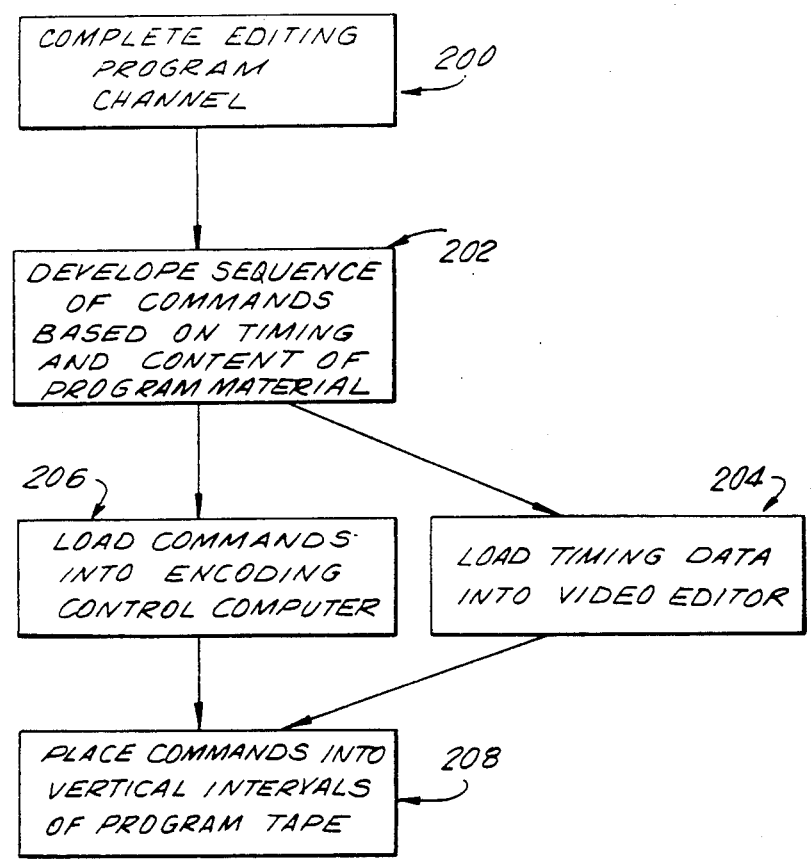
FIG. 4 is a diagrammatic illustration of a command development flow diagram in accordance with the presently preferred method of the present invention.
Figure 5:
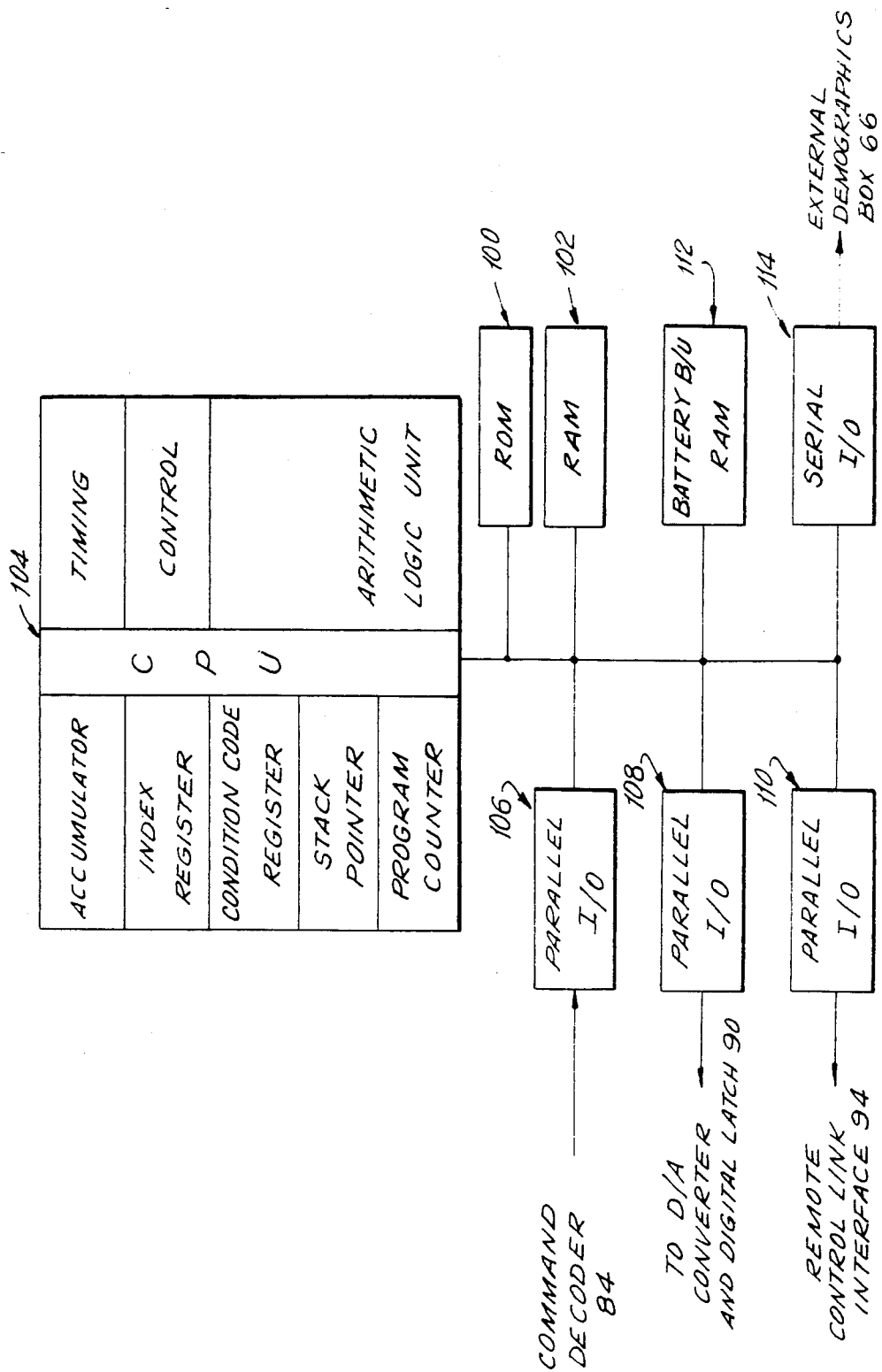
FIG. 5 is a block diagram of a typical micro-controller portion of the home unit of FIG. 2 which may be employed in practicing the presently preferred method of the present invention.

Referring now to the drawings in detail, and initially to FIGS. 1, 3, 4, and 6, the presently preferred method of the present invention preferably utilizes a plurality of different continuous real time interactive television messages which are substantially simultaneously provided during a given prerecorded television program to a plurality of multichannel television receivers, such as represented by conventional television receiver 20 in FIG. 1, which form part of a conventional one-way common television signal distribution network such as a conventional CATV television network generally represented by the reference numeral 10 in FIG. 1. As shown by way of example in FIG. 1, the typical one way cable television distribution network 10 preferably includes by way of example, four conventional video tape recorders 22, 24, 26, and 28, assuming, by way of example, four information channels are utilized although no such limitation is required, and a conventional sync generator 30, with the video tape recorders 22, 24, 26, 28 and the sync generator 30 comprising the program source. In addition, such a typical one-way cable television distribution system 10 also includes conventional links 32, 34, 36 and 38, respectively, to a conventional satellite or microwave or other master distribution network 40 and, therefrom, via other conventional links 42, 44, 46 and 48 and conventional modulators 50, 52, 54 and 56, to a conventional signal combiner 58 which combines the outputs of the video tape recorders 22, 24, 26 and 28 and the sync generator 30 into a conventional multiplexed television signal which is transmitted over the conventional cable television distribution network 60 to the subscribers. One such typical subscriber 62 is shown, by way of example, in FIG. 1. As shown in FIGS. 1, 2 and 5, by way of example, a typical subscriber 62 system may include a conventional multichannel television 20, a home unit 64, to be described in greater detail with reference to FIGS. 2 and 5, an external demographics box 66 which may be linked via a conventional modem over a conventional telephone line 68 to a remote collector of this data, and a conventional remote control unit 70 which may be connected by a conventional type of wireless link 72 to the home unit 64 which controls the selection of the program information to be displayed at any given time on the viewer's television 20 on the interactive cable channel. The manner of selection may, if desired be as described in my previous U.S. Pat. No. 4,264,925 and 4,264,924 or my copending U.S. patent application Ser. No. 390,877, filed June 22, 1982, all of which were specifically incorporated by reference herein in their entirety.

As shown by way of example, in FIG. 2, the home unit 64 may include a conventional varactor tuned local oscillator 80 which receives the RF television signal provided via the cable television distribution network 60 and which provides the displayable signal at the frequency of the interactive channel on the conventional multichannel television 20 by mixing in the manner previously described in my previous U.S. Pat. No. 4,264,924 and my copending U.S. patent application Ser. No. 390,877, filed June 22, 1982. As shown by way of example in FIG. 2, in order to obtain the desired selection, in accordance with the presently preferred method of the present invention, the home unit 64 prefereably may include a conventional demodulator 82, a conventional command decoder 84 and vertical interval detector 86, a conventional microcontroller or microprocessor 88 to be described in greater detail hereinafter with reference to FIG. 5, a conventional digital latch 90 and a conventional digital-to-analog converter 92. The remote control unit 70, by way of example, may use infra-red in a wireless optical link to the microcontroller 88 via a conventional remote control link interface 94. In the example shown in FIG. 2, a one to four selection is made between the remote control unit 70 and the microcontroller 88 and a one-of-eight choice between the microcontroller 88 and digital latch 90 and digital-to-analog converter 92. As further shown by way of example in FIG. 5, a typical microcontroller or microprocessor 88 which may be employed in accordance with the presently preferred method of the present invention, preferably includes a conventional read only memory 100 and random access memory 102, a conventional central processor unit or CPU 104 containing a conventional accumulator, index register, condition code register, stack pointer, program counter, timing, control, and arithmetic logic unit, such as a Motorola 6800, and conventional parallel input/output devices 106, 108 and 110 linking the microprocessor or microcontroller 88, respectively, to the command decoder 84, digital latch 90, and remote control link interface 94. Typically, a conventional battery back-up 112 for the memory is provided as is a conventional serial input-/output device 114 linking the microprocessor 88 to the demographics box 66.

As will be described in greater detail hereinafter with reference to the presently preferred method of the present invention, various command signals can be inserted in the prerecorded program information so as to control the selection of various interactive information by the home unit 64 based on, for example, selection profiles which have been stored at the home unit 64 and which are modified from the head end. FIGS. 3 and 4 illustrate, by way of example, a manner in which such command signals can be inserted in the prerecorded information at the head end. As illustratively shown in FIG. 4, which is a command development flow chart, typical steps in creating such command signals for insertion with the prerecorded program information are to complete the editing of the program channel, as represented by block 200, then to develop the sequence of commands based on the timing and content of the programmed material, as represented by block 202, then to load the timing data into a conventional video editor, as represented by block 204, while loading the commands into a conventional encoding control computer as well, as represented by block 206, and thereafter to combine the timing data and the commands and to place these commands into, by way of example, the vertical intervals of the program tape, as represented by block 208. This command insertion step is represented in greater detail by the block diagram of FIG. 3. As illustrated in FIG. 3, the insertion of the commands starts with a program tape having no commands recorded thereon, as represented by block 210, with the program tape being placed on the conventional video tape recorder such as recorder 22, by way of example, which receives timing signals from the conventional video editor 212, with this information being provided to a conventional vertical interval encoder 214 which also receives preloaded commands from the encoding control computer, as represented by block 216, with a trigger pulse being provided from the video editor to the vertical interval encoder 214, all of this information being provided, along with the timing signal to the video tape recorder 22 to ultimately provide a program tape with the commands stored thereon in the vertical interval, as represented by block 220. It should be noted that the entire command insertion sequence is a conventional type of technique for inserting commands on to video tape although the ultimate utilization thereof in the presently preferred method of the present invention has not been previously done before to applicant's knowledge.

Referring now to the presently preferred method of the present invention, this method is presently referred to as stacking which is the principal of expanding in both time and space to provide time and space multiplexing of integral portions of video displayable data unlike my prior U.S. Pat. Nos. 4,264,924 and 4,264,925, by way of example, in which the next adjacent or sequential information segment must be interactively accessed, thereby limiting the amount of choices to only one out of the plurality of time concurrent channels or choices being transmitted. As will be described in greater detail hereinafter, the presently preferred stacking method of the present invention permits a choice or selection to be made to subsequent time concurrent information arrays or stacks which are spaced apart from sequential arrays or stacks, thereby multiplexing the selection both in time and space as opposed to just in space. An example of such a stacking array in accordance with the presently preferred method of the present invention is illustrated in FIG. 6 in which the subscriber can, in reality, choose one-of-nine choices by selecting a message path through the stacking array in response to a single interactive selection, by way of example, employing four channels, as opposed to only choosing one-of-four as was possible in the interactive systems described in my prior U.S. Pat. Nos. 4,264,924 and 4,264,925 and my prior U.S. patent application Ser. No. 390,877 filed June 22, 1982. Referring to FIG. 6, by way of example, in accordance with the presently preferred method of the present invention, if it was desired to provide the subscriber with one-out-of-nine complete program information contents, such as television commercials, by way of example, as shown in FIG. 6, assuming you have four prerecorded channels, 300, 302, 304, and 306, respectively, with one channel being prerecorded on each of the four video tape recorders 22 through 28 respectively, as illustrated in FIG. 1, a common prerecorded television message commonly displayable during a given television program, such as from an announcer, as represented on channel 300 in FIG. 6, is provided. With the announcer on track 300, the nine different complete commercials represented by blocks 308, 310, 312, 314, 316, 318, 320, 322, and 324, would be prerecorded on channels 302, 304 and 306 with, in the example of FIG. 6, commercials 308, 314 and 320 being adjacent each other on channel 302, commercials 310, 316 and 322 being adjacent each other on channel 304, and commercials 312, 318 and 324 being adjacent each other on channel 306. Each of the adjacent information segments or commercials is preferably separated from each other by a segway portion which is a transition portion, as will be described in greater detail hereinafter, to allow for a smooth transition of the displayable information on the screen while switching is being accomplished between the channels in response to interactive selection by the subscriber or the microcontroller 88. The segway portions have merely been labeled "segway" in FIG. 6. In addition, it should be noted that commercials 308, 310 and 312 comprise a first stack, commercials 314, 316 and 318 comprise a second stack and commercial 320, 322 and 324 comprise a third stack. In addition, it should be noted that although only three stacks comprising nine complete messages are illustrated in FIG. 6, any desired number of stacks and messages can be provided in accordance with the presently preferred method of the present invention. As will be described hereinafter, one possible manner of selection of the appropriate commercial in the plurality of stacks illustrated in FIG. 6, in accordance with the presently preferred method of the present invention, can be based on a selection profile which may preferably be created interactively during viewing of the program in advance of the commercials, or at some earlier time, and stored in memory in the home unit 64. For example, let's assume that commercial 308 is for males over 21 who are single, commercial 310 is for females under 21 who are single and commercial 3 is for males under 21 who are single. The subscriber would be viewing a program on the interactive channel and the announcer would be displayed on the screen and talking to the viewer, with the announcer appearing at this point in time on all four channels 300, 302, 304 and 306 so that the announcer message would be displayed irrespective of which channel the subscriber had selected during the interactive programming preceding the commercials. Assuming the subscriber viewing the interactive program has identified himself as a male over 21 who is single, which information has been stored in the home unit 64, when the announcer announces that now, let's break for a commercial, at time $T_a$ illustrated in FIG. 6, the system would switch from channel 300 to channel 302 and commercial 308 would be displayed on the screen with the appropriate mixing of the signals by the home unit 64 to insure that channel 302 is displayed. At the end of commercial 308, another commercial could be viewed addressed to that subscriber or generally to all subscribers or the system could switch back to the announcer and continue along with the show. In this regard, assuming you come back to the announcer, the subscriber would have only seen the one tailored commercial even though, theoretically, in the example of FIG. 6, there were nine commercials available to the subscriber based on the subscriber's selection profile stored in the memory of the microprocessor 88.

As shown and preferred, by way of example, in FIG. 6, the announcer breaks to the commercial by means of the segway to the commercial located before the prerecorded commercials. For example, the announcer, assuming it was a game show, might say "Today's game show is really a very special one", and the system would cut to channel 2 where reference numeral 302 appears, and the same announcer would say, with a different camera angle to avoid a jump cut, "but before we go any further let's pause for a commercial" and commercial 308, for example, would then be displayed. Thus, the segways into the commercial are located in the actual channels themselves. Of course, there are many other ways to accomplish this transition in a smooth fashion without departing from the presently preferred method of the present invention. If, for example, you wanted to provide three consecutive commercials to the subscriber, the system might switch between channel 2, channel 3 and channel 4, assuming these three commercials were the tailored commercials for that selection profile, to get three commercials out of the nine provided in the example of FIG. 6, whereas another subscriber might go from commercial 3 to commercial 6 to commercial 7 depending on that subscriber selection profile, both of which would be occuring at the same point in real time so that different tailored commercials would be provided simultaneously to different subscribers with the combination of channels 2, 3 and 4, for example, which provides the commercials which vary based on the selection profile of the subscriber. As was previously mentioned, in order to switch based on selection profile, the microprocessor 88 in the home unit 64 would have stored several interactive inquiries which had been provided to that subscriber either immediately in advance of the program, during the program, or at some other time interval, and these responses would have been stored in the memory in various registers so as to provide certain numeric indicators representative of a particular selection profile, by way of example. For example, the subscriber may have been asked if the subscriber was a male or female, whether it had a pet, what age catagory the subscriber was, etc. At the end of the week, this information would be stored to provide a particular number, such as 32, in memory number 1 which would indicate, for example, that the subscriber had responded that it owned a cat. This being the case, when the system broke for a commercial, and assuming that one of the commercials in the stack was tailored for cat lovers, the microprocessor 88 would look for a 32 in its memory so as to switch to the channel containing the commercial for cat lovers. Of course, as illustrated in FIG. 5, there would be a battery back-up 112 in the event there was a power loss so that the information stored in memory as to the selection profile of the subscriber would not be lost. However, the system could be arranged so that if this occurred, a general commercial would be shown to the subscriber. In this regard, commercial 324, for example, could be such a general commercial that anyone could see irrespective of their selection profile. Thus, a general data display could be provided where there was no targeted selection profile. In this regard, the worst that could happen if the system breaks down is that the subscribers would be right back where they started if it was not an interactive system.

In addition, the targeted profile, as was previously mentioned can be changed from the head end. Assume a ski commercial was shown and the head end wanted feedback as to whether the subscribers were receptive to the commercial. Thus, at the end of the commercial a toll free number could be provided and based on the call back responses, a decision could be made at the head end whether the commercial was receiving the desired response. If it were not, by means of a command signal generated from the head end, the selection profile for the commercial could changed. In this regard, a given selection profile can be represented by a given number with multiple local memories being provided to subdivide a stored profile into a plurality of unique subprofiles, and the system could access an accumulation register which would represent the overall profile, or any one of the submemories which would represent a segment of the profile. For example, when a commercial is put into the system it could be given a number between one and 20 with each number representing a different selection profile, with the number being capable of being changed at any time. Thus, if the commercial were prerecorded with a number corresponding to a particular selection profile, such as a single man over 21, and it was desired to change this responsive selection profile, at the head end, a command code could be inserted for the commercial changing its target number. Thus, the microprocessor 88 would then respond to a ted via a modem to a collection source. The system could conventionally be arranged so that the memory could be accessed remotely via the telephone line in the modem in order to poll the home at any time.

As was previously mentioned, the presently preferred stacking method of the present invention could have many applications such as a score for a quiz or game show with, instead, the commercials represented in FIG. 6 being replaced by various messages relating to different score values between say 100 points and 800 points. If desired, the announcer could be eliminated on channel one and a different announcer could be put on channel 2 so that there would be one announcer on channel 1 saying one thing and another announcer on channel 2 saying another thing although the announcer on channel 2 would only start where commercial 320 had been located. This concept could also be applied to an exercise show or any other interactive show. In summary, the presently preferred stacking method of the present invention can be used to create more choices than there are channels for things like game shows, showing many commercials, starting a show with a number of things from previous memories and anything else that affords a place where more things are needed to say than channels are provided to say it in.

An example of a portion of a program such as an exercise show, containing stacked information, by way of example, is given below:

| CHANNEL 1 | CHANNEL 2 | CHANNEL 3 | CHANNEL 4 |
| --- | --- | --- | --- |
| VO: While we are resting, let me just mention that it is normal to feel tired and a bit muscle fatigued, even out of breath, after doing these arm and chest excercises. | VO: While we are resting let me just mention that since the tummy and rear are the most difficult areas of the body to improve. this workout is strenous and will make you out of breath. | VO: While we are resting, let me just mention that since the legs and thighs are the most powerful muscles in the body, it is normal to be out of breath after focusing excercises on this part of the body. | VO: While we are resting, let me just mention that since the general workout you chose uses almost every part of the body, it is normal to feel out of breath at this point. |
| VO: Since I am assuming you are a beginner at this point it is important to realize that you will get less fatigued and out of breath as you do more excercise. OK let's get on our feet and continue the workout. | VO: Since you are a beginner it is important for you to know that you will get less and less tired as you develop these specific muscles. OK let's get on our feet and continue the workout. | VO: Since you are an intermediate you will find as you work out more and and eventually become advanced, you will get less tired. OK let's get on our feet and continue the workout. | VO: Even students who are advanced like yourself will often get out of breath with this type of exercise. It's perfectly normal. OK, let's get on our feet and continue the workout. |
| Let's do a few general excercises just to catch our breath and round out the workout. | OK let's now even get more specific and do special exercises for the woman that will work on those arm and chest areas of yours. | OK let's now even get more specific and do special exercises for the woman that will work on that tummy and rear end of yours. | OK now let's get even more specific and do a few special exercises for the woman in the leg and thigh department. |
|  | OK great. Now let's do some general exercises to round out today's workout. | OK great. Now let's do some general exercises to round out today's workout. | OK great. Now let's do some general exercises to round out today's workout. |
| General exercises continue. | OK now let's get even more specific and do special exercises for the man that will work on those arm and chest areas of yours. | OK, now let's even get more specific and do special exercises for the man that will work on that stomach and buttocks of yours. | OK, Now let's get even more specific and do some special exercises for the man in the leg and thigh department. |
| OK, consider the workout well done. of | OK, well thank you Sir. | OK, well thank you Sir. | OK, well thank you Sir. | different selection profile to select that commercial. In addition, if desired, external demographics can be recorded in a separate memory 66, such as a Neilson type box, which would accumulate the answers of the particular subscriber which answers could then be transmit- Summarizing the overall presently preferred method of the present invention for enabling a plurality of different continuous real time interactive television messages of any type to be substantially simultaneously provided during a given prerecorded television program from a plurality of multichannel television receivers comprising a one-way common television distribution network, such as a cable television network, the basic steps consist of transmitting a plurality of different spatially adjacent multichannel television message stacks over a plurality of contemporaneous channels with the program content for a given television program comprising a common prerecorded television message commonly displayable during the given television program irrespective of any interactive selection of the interactively selectable television messages; providing the plurality of stacks over the plurality of channels to the multichannel storage means; and interactively selecting in real time one of the selectable messages from the plurality of stacks for providing the television programming sequence program information content. A different interactive selection provides a different program information content for the television programming sequence with a different receiver being capable of independently selecting a different program information content for the television programming sequence. Each of the aforementioned adjacent multiple stacks comprises a simultaneously transmitted plurality of different separately selectable substantially complete prerecorded television messages in real time over the plurality of contemporaneous television channels to the plurality of multichannel television receivers through the one-way distribution or cable network. A single substantially complete television message is interactively selectable from the plurality of adjacent stacks for providing the real time interactive television message for the multichannel television receiver. As was previously mentioned, the quantity of available interactively selectable prerecorded television messages in the adjacent stacks is greater than the quantity of contemporaneous television channels with the plurality of stacks comprising a television programming sequence having an interactively variable program information content for a given television program. As was previously mentioned, the presently preferred method of the present invention includes a step of interactively creating a selection profile for a subscriber and interactively selecting in real time one of the selectible messages from the plurality of stacks based upon the selection profile so as to provide a tailored program content for the television programming sequence for that subscriber. This interactive selection profile, as was previously mentioned, can be interactively created in advance of transmission of the television program.

By utilizing the preferred method of the present invention multiple users of a one-way distribution network may obtain an individualized program information content for a television programming sequence, with the quantity of available interactively selectable program information contents for the television programming sequence being greater than the quantity of available channels of contemporaneous message transmission.

What is claimed is:

1. In a method for enabling a plurality of different continuous real time interactive television messages to be substantially simultaneously provided during a given prerecorded television program from a plurality of multichannel television receivers comprising a one-way common television signal distribution network, the improvement comprising the steps of:

(a) transmitting in sequence a plurality of different multichannel television message stacks, with each stack comprising a plurality of time concurrent multichannel television messages, said plurality of stacks comprising a stacking array, said stacking array providing a plurality of selectable time and space multiplexed complete prerecorded television messages, said array being transmitted over a plurality of contemporaneous channels to said plurality of multichannel television receivers through said one way distribution network, a single substantially complete television message being interactively selectable from said array for providing said real time interactive television message for said multichannel television receiver, the quantity of available interactively selectable prerecorded television messages in said array being greater than the quantity of said plurality of available contemporaneous television channels, said array comprising a television programming sequence having an interactively variable program information content for a given television program, said program content for said given television program further comprising a common prerecorded television message commonly displayable during said given television program irrespective of any interactive selection of said interactively selectable television messages;

(b) providing said array over said plurality of channels to said multichannel receiver through said one-way distribution network from a multichannel storage means; and (c) interactively selecting in real time multichannel message path through said array for providing said television programming sequence program information content, said interactive selection being multiplexed in both time and space in said array and selecting said message path through said array in reponse to a single interactive selection, a different interactive selection providing a different message path through said array and a different program information content for said television programming sequence, a different receiver being capable of independently selecting a different program information content from said array for said television programming sequence, whereby multiple users of said one way distribution network may obtain an individualized program information content for said television programming sequence, with the quantity of available interactively selectable program information contents in said array for said television programming sequence being greater than the quantity of available channels of contemporaneous message transmission.

2. An improved method in accordance with claim 1 wherein each of said complete television messages in said array comprising said television programming sequence comprises a segway portion for providing an information transition between said common television message and said television programming sequence, said television programming sequence and said common television message being adjacent in real time in said given television program.

3. An improved method in accordance with claim 2 wherein said television program comprises a plurality of said television sequences.

4. An improved method in accordance with claim 1 wherein said television program comprises a plurality of said televison sequences.

5. An improved method in accordance with claim 1 wherein said interactive selecting step further comprises the steps of interactively creating a selection profile for a subscriber and interactively selecting in real time one of said selectable messages from said array based upon said selection profile, whereby a tailored program content for said television programming sequence for said subscriber is provided.

6. An improved method in accordance with claim 5 wherein each of said complete television messages in said array comprising said television programming sequence comprises a segway portion for providing an information transition between said common television message and said television programming sequence, said television programming sequence and said common television in real time message being adjacent in said given television program.

7. An improved method in accordance with claim 6 wherein said television program comprises a plurality of said television sequences.

8. An improved method in accordance with claim 5 wherein said television program comprises a plurality of said television sequences.

9. An improved method in accordance with claim 5 wherein said interactive selection profile creating step further comprises the step of interactively creating said selection profile in advance of transmission of said television program, said real time interactive selection based upon said selection profile being during transmission of said television program.

10. An improved method in accordance with claim 9 wherein each of said complete television messages in said array comprising said television programming sequence comprises a segway portion for providing an information transition between said common television message and said television programming sequence, said television programming sequence and said common television message being adjacent in real time in said given television program.

11. An improved method in accordance with claim 10 wherein said television program comprises a plurality of said television sequences.

12. An improved method in accordance with claim 1 wherein said transmitting step further comprises the step of transmitting a plurality of said common prerecorded television messages during said given television program, said plurality of common television messages having a different program information content, whereby said television program comprises said television programming sequence and said different common television messages.

13. An improved method in accordance with claim 12 wherein each of said complete television messages in said array comprising said television programming sequence comprises a segway portion for providing an information transition between one of said common television messages and said television programming sequence, said television programming sequence and said one common television message being adjacent in real time in said given television program.

14. An improved method in accordance with claim 13 wherein said television program comprises a plurality of said television sequences, whereby said television program comprises said television programming sequences and said different common television messages.

15. An improved method in accordance wth claim 12 wherein said television program comprises a plurality of said television sequences, whereby said television program comprises said television programming sequences and said different common television messages.

16. An improved method in accordance with claim 12 wherein said interactive selecting step further comprises the steps of interactively creating a selection profile for a subscriber and interactively selecting in real time one of said selectable messages from said plurality of stacks based upon said selection profile, whereby a tailored program content for said television programming sequence for said subscriber is provided.

17. An improved method in accordance with claim 16 wherein said interactive selection profile creating step further comprises the step of interactively creating said selection profile in advance of transmission of said television program, said real time interactive selection based upon said selection profile being during transmission of said television program.

18. An improved method in accordance with claim 1 wherein at least one of said array comprises a complete common message in place of one of said interactively selectable television messages.

19. An improved method in accordance with claim 1 wherein said television programming sequence comprises a plurality of different television commercial messages, at least a plurality of said complete television messages comprising said array each comprising a different television commercial message.

20. An improved method in accordance with claim 19 wherein said interactive selecting step further comprises the steps of interactively creating a selection profile for a subscriber and interactively selecting in real time one of said selectable messages from said array based upon said selection profile, whereby a tailored program content for said televison programming sequence for said subscriber is provided, said tailored program content comprising a tailored television commercial for said subscriber.

21. An improved method in accordance with claim 20 wherein each of said complete television messages in said array comprising said television programming sequence comprises a segway portion for providing an information transition between said common television message and said television programming sequence, said television programming sequence and said common television message being adjacent in real time in said given television program.

22. An improved method in accordance with claim 21 wherein said interactive selection profile creating step further comprises the step of interactively creating said selection profile in advance of transmission of said television program, said real time interactive selection based upon said selection profile being during transmission of said television program.

23. An improved method in accordance with claim 20 wherein said interactive selection profile creating step further comprises the step of interactively creating said selection profile in advance of transmission of said television program, said real time interactive selection based upon said selection profile being during transmission of said television program.

24. An improved method in accordance with claim 19 wherein said television program comprises a plurality of said television programming sequences of different television commercial messages.

25. An improved method in accordance with claim 24 wherein said interactive selecting step further comprises the steps of interactively creating a selection profile for a subscriber and interactively selecting in real time one of said selectable messages from said array based upon said selection profile, whereby a tailored program content for said televison programming sequence for said subscriber is provided, said tailored program content comprising a tailored television commercial for said subscriber.

26. An improved method in accordance with claim 25 wherein each of said complete television messages in said array comprising said television programming sequence comprises a segway portion for providing an information transition between said common television message and said television programming sequence, said television programming sequence and said common television message being adjacent in real time in said given television program.

27. An improved method in accordance with claim 26 wherein said interactive selection profile creating step further comprises the step of interactively creating said selection profile in advance of transmission of said television program, said real time interactive selection based upon said selection profile being during transmission of said television program.

28. An improved method in accordance with claim 25 wherein said interactive selection profile creating step further comprises the step of interactively creating said selection profile in advance of transmission of said television program, said real time interactive selection based upon said selection profile being during transmission of said television program.

29. An improved method in accordance with claim 5 wherein said television program is an interactive game show and said television programming sequence comprises different game scores, said interactive selecting step comprising the step of interactively playing the game to obtain said selection profile, said selectable messages comprising said different game scores, whereby an interactive game may be played and scored in real time with the television program content being varied accordingly.

30. An improved method in accordance with claim 5 wherein said transmitting step further comprises the step of transmitting a change code signal to the plurality of television receivers over said one way distribution network for making the receivers responsive to a different selection profile, whereby the selection profile upon which said interactive selection is based may be varied from the head end.

31. An improved method in accordance with claim 30 wherein said interactive selection profile creating step further comprises the step of interactively creating said selection profile in advance of transmission of said television program, said real time interactive selection based upon said selection profile being during transmission of said television program.

* * * * *